United States Patent
Taniguchi et al.

(10) Patent No.: US 11,708,032 B2
(45) Date of Patent: Jul. 25, 2023

(54) DRIVING SUPPORT DEVICE

(71) Applicant: Mitsubishi Electric Corporation, Tokyo (JP)

(72) Inventors: Takuya Taniguchi, Tokyo (JP); Noritaka Kokido, Tokyo (JP); Nariaki Takehara, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 17/312,473

(22) PCT Filed: Jan. 31, 2019

(86) PCT No.: PCT/JP2019/003339
§ 371 (c)(1),
(2) Date: Jun. 10, 2021

(87) PCT Pub. No.: WO2020/157901
PCT Pub. Date: Aug. 6, 2020

(65) Prior Publication Data
US 2022/0111794 A1    Apr. 14, 2022

(51) Int. Cl.
*B60R 1/25* (2022.01)
*B60Q 9/00* (2006.01)
(Continued)

(52) U.S. Cl.
CPC ............... *B60R 1/25* (2022.01); *B60Q 9/008* (2013.01); *H04N 5/2628* (2013.01);
(Continued)

(58) Field of Classification Search
CPC ............... B60R 1/25; B60R 2300/105; B60R 2300/303; B60R 2300/607;
(Continued)

(56) References Cited

U.S. PATENT DOCUMENTS

2006/0274147 A1* 12/2006 Chinomi .................. B60R 1/00
                                                            348/E7.086
2007/0279493 A1* 12/2007 Edanami .............. B62D 15/028
                                                                348/148
(Continued)

FOREIGN PATENT DOCUMENTS

| JP | 2011-30078 A | 2/2011 |
| JP | 2017-19459 A | 1/2017 |
| JP | 2018-74286 A | 5/2018 |

OTHER PUBLICATIONS

Written Opinion for PCT/JP2019/003339 dated Mar. 26, 2019.
International search report for PCT/JP2019/003339 dated Mar. 26, 2019.

*Primary Examiner* — Farzana Hossain
(74) *Attorney, Agent, or Firm* — Sughrue Mion, PLLC; Richard C. Turner

(57) ABSTRACT

Provided is a driving support device configured to: generate a bird's-eye view image around an own vehicle from periphery images acquired from a plurality of periphery monitoring cameras, and generate a cropped bird's-eye view image by cropping an image of a cropping range including a blind spot range from the generated bird's-eye view image; generate a rear-lateral side converted image by converting a rear-lateral side direction image acquired from a rear-lateral side monitoring camera into an image in which left and right are inverted; and generate a combined image in which the generated cropped bird's-eye view image and the generated rear-lateral side converted image are arranged, and control a display device such that the generated combined image is displayed by the display device.

8 Claims, 5 Drawing Sheets

(51) Int. Cl.
  *H04N 5/262* (2006.01)
  *H04N 7/18* (2006.01)
  *H04N 23/90* (2023.01)

(52) U.S. Cl.
  CPC ............. *H04N 7/181* (2013.01); *H04N 23/90* (2023.01); *B60R 2300/105* (2013.01); *B60R 2300/303* (2013.01); *B60R 2300/607* (2013.01); *B60R 2300/802* (2013.01); *B60R 2300/8093* (2013.01)

(58) Field of Classification Search
  CPC ...... B60R 2300/802; B60R 2300/8093; B60R 1/26; B60Q 9/008; H04N 5/247; H04N 5/2628; H04N 7/181; H04N 23/90
  See application file for complete search history.

(56) References Cited

U.S. PATENT DOCUMENTS

| | | | |
|---|---|---|---|
| 2011/0025848 A1* | 2/2011 | Yu ............................ | B60R 1/00 348/148 |
| 2011/0234802 A1* | 9/2011 | Yamada ................. | G02B 27/01 348/148 |
| 2012/0154591 A1* | 6/2012 | Baur ........................ | B60R 1/08 348/148 |
| 2013/0054086 A1* | 2/2013 | Lo ............................ | B60R 1/00 701/36 |
| 2019/0001968 A1* | 1/2019 | Yorifuji ................ | B62D 15/027 |
| 2019/0248288 A1* | 8/2019 | Oba ........................ | B60R 1/00 |
| 2020/0148112 A1* | 5/2020 | Itoh ........................ | G06V 40/18 |

* cited by examiner

DRIVING SUPPORT DEVICE

CROSS-REFERENCE TO RELATED APPLICATIONS

This application is a National Stage of International Application No. PCT/JP2019/003339 filed Jan. 31, 2019.

TECHNICAL FIELD

The present invention relates to a driving support device.

BACKGROUND ART

Hitherto, vehicles have a side mirror for a driver to monitor a rear-lateral side direction of the vehicle. However, even when the driver is monitoring a related-art side mirror, there is a blind spot range in the rear-lateral side direction which is not visually recognizable by the driver. As a result, there is a need for a technology which enables the driver to grasp the situation of the blind spot range which is a blind spot in the case of a related-art side mirror. Therefore, there has been proposed a technology in which a wide-angle camera having a wide display range is used to display a wide area on a display (see, for example, Patent Literature 1).

CITATION LIST

Patent Literature

[PTL 1] JP 2017-19459 A

SUMMARY OF INVENTION

Technical Problem

In the related-art technology described in Patent Literature 1, unlike the image actually seen by the human eyes, the image of the wide-angle camera is distorted, and therefore the field of view of the related-art side mirror is not secured. As a result, it is difficult for the driver to grasp a sense of distance to an object in the periphery of the own vehicle. Therefore, there is required a new technology which enables the situation of the blind spot range which is a blind spot in the case of the related-art side mirror to be grasped while ensuring the field of view of the related-art side mirror.

The present invention has been made to solve the above-mentioned problem. It is an object of the present invention to obtain a driving support device which enables a situation of a blind spot range which is a blind spot in the case of the related-art side mirror to be grasped while ensuring a field of view of the related-art side mirror.

Solution to Problem

According to one embodiment of the present invention, there is provided a driving support device including: a rear-lateral side monitoring camera configured to photograph a rear-lateral side direction of an own vehicle; a plurality of periphery monitoring cameras each configured to photograph a periphery of the own vehicle; a driving support ECU configured to acquire a rear-lateral side direction image which is an image of the rear-lateral side direction of the own vehicle photographed by the rear-lateral side monitoring camera, and periphery images which are images of the periphery of the own vehicle photographed by the plurality of periphery monitoring cameras; and a display device configured to display an image, wherein driving support ECU is configured to: generate a bird's-eye view image around the own vehicle from the periphery images acquired from the plurality of periphery monitoring cameras, and generate a cropped bird's-eye view image by cropping an image of a cropping range including a blind spot range from the generated bird's-eye view image; generate a rear-lateral side converted image by converting the rear-lateral side direction image acquired from the rear-lateral side monitoring camera into an image in which left and right are inverted; and generate a combined image in which the generated cropped bird's-eye view image and the generated rear-lateral side converted image are arranged, and control the display device such that the generated combined image is displayed by the display device.

Advantageous Effects of Invention

According to the present invention, it is possible to obtain the driving support device which enables the situation of the blind spot range which is the blind spot in the case of the related-art side mirror to be grasped while ensuring the field of view of the related-art side mirror.

DESCRIPTION OF EMBODIMENTS

Now, a driving support device according to a preferred embodiment of the present invention is described referring to the accompanying drawings. In the illustration of the drawings, the same or corresponding components are denoted by the same reference symbols, and the overlapping description thereof is herein omitted.

First Embodiment

Figure 1:
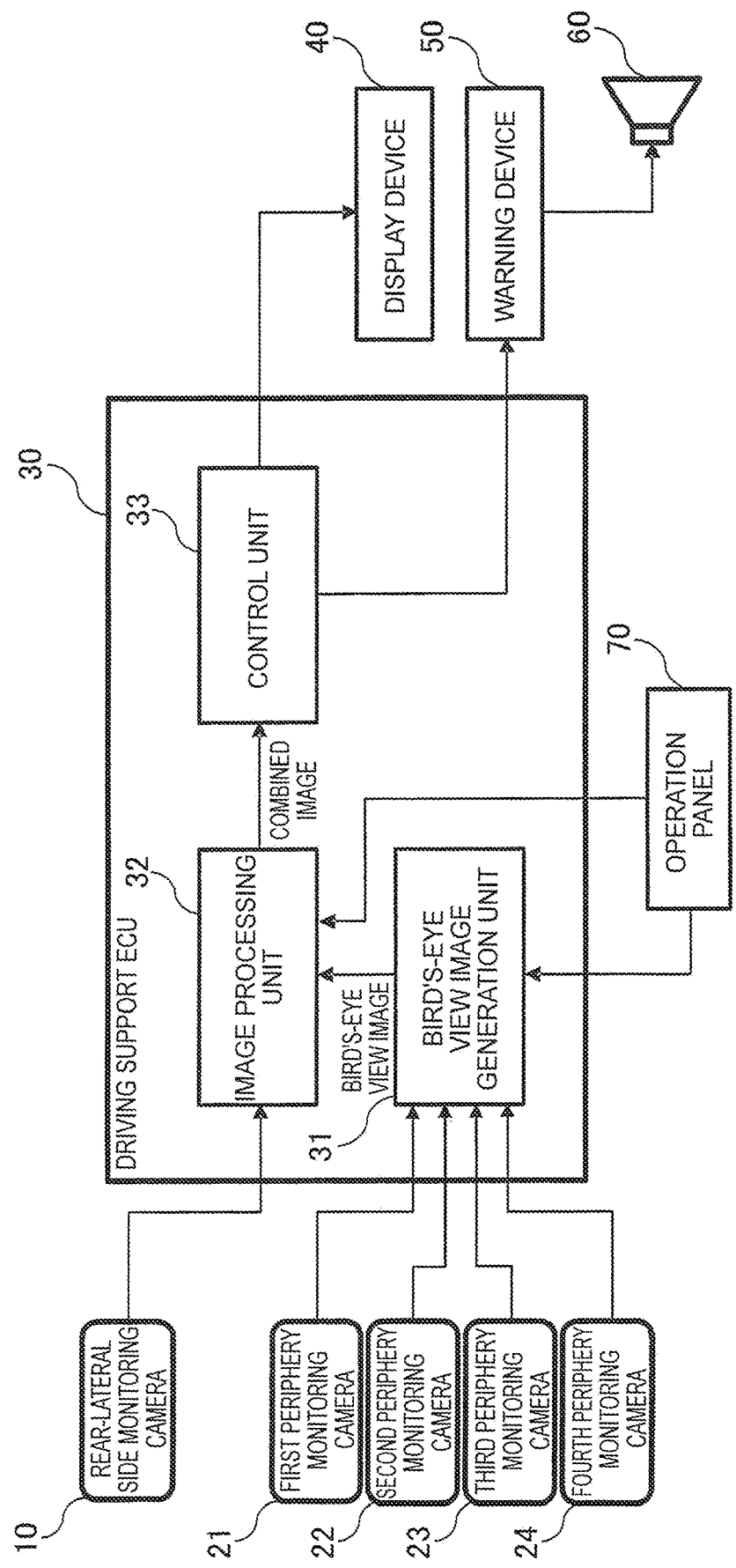
FIG. 1 is a configuration diagram for illustrating a driving support device according to a first embodiment of the present invention.
Figure 2:
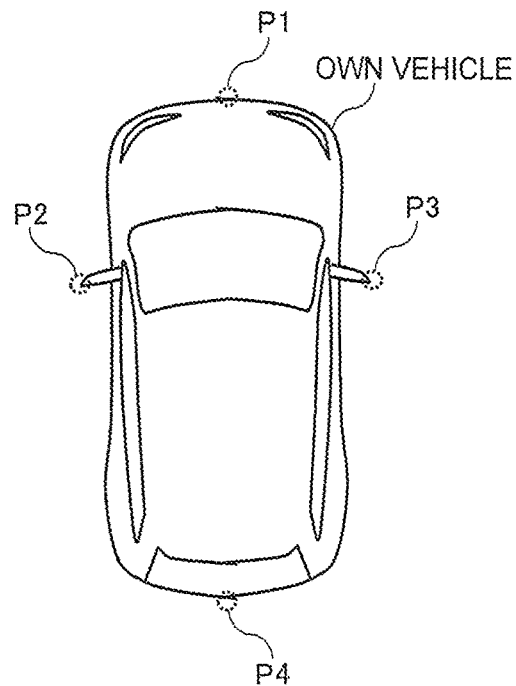
FIG. 2 is a top view for illustrating installation positions of a rear-lateral side monitoring camera and each of four periphery monitoring cameras in an own vehicle in the first embodiment of the present invention.

FIG. 1 is a configuration diagram for illustrating a driving support device according to a first embodiment of the present invention. FIG. 2 is a top view for illustrating installation positions of a rear-lateral side monitoring camera 10 and each of four periphery monitoring cameras 21 to 24 in an own vehicle in the first embodiment of the present invention.

The driving support device illustrated in FIG. 1 is mounted in the own vehicle. The own vehicle is, for example, a four-wheeled vehicle. The driving support device illustrated in FIG. 1 includes the rear-lateral side monitoring camera 10, a first periphery monitoring camera 21, a second periphery monitoring camera 22, a third periphery monitoring camera 23, a fourth periphery monitoring camera 24, a driving support electronic control unit (ECU) 30, a display device 40, a warning device 50, a speaker 60, and an operation panel 70.

The rear-lateral side monitoring camera 10 is configured to photograph a rear-lateral side direction of the own vehicle. In the first embodiment, as a specific example of the rear-lateral side direction of the own vehicle, there is described a case in which the rear-lateral side monitoring camera 10 is configured to photograph a left rear-lateral side direction of the own vehicle.

As illustrated in FIG. 2, the rear-lateral side monitoring camera 10 is installed at a position P2 of a left side mirror of the own vehicle. The rear-lateral side monitoring camera 10 photographs the left rear-lateral side direction of the own vehicle, and outputs a left rear-lateral side direction image, which is an image of the photographed left rear-lateral side direction of the own vehicle, to the driving support ECU 30. The left side mirror is a mirror for the driver to monitor the left rear-lateral side direction of the own vehicle.

The orientation of the rear-lateral side monitoring camera 10 is the same as the orientation of the side mirror. Like the side mirror, the rear-lateral side monitoring camera 10 has an angle of view which enables a sense of distance to an object shown in the image to be grasped. Through construction of such a system configured to display an image from the rear-lateral side monitoring camera 10, the driver can see the view of the rear-lateral side direction seen by the side mirror. Such a system is also referred to as an "electronic mirror," and is a known system.

The four periphery monitoring cameras 21 to 24 are each installed at a different position of the own vehicle, and are configured to photograph a periphery of the own vehicle.

As illustrated in FIG. 2, the first periphery monitoring camera 21 is installed at a position P1 at a front portion of the own vehicle. The first periphery monitoring camera 21 is configured to photograph a front direction of the own vehicle as the periphery of the own vehicle, and to output a first periphery image, which is an image of the photographed front direction of the own vehicle, to the driving support ECU 30.

As illustrated in FIG. 2, the second periphery monitoring camera 22 is installed at the position P2 of the left side mirror of the own vehicle. The second periphery monitoring camera 22 is configured to photograph a left side direction of the own vehicle as the periphery of the own vehicle, and to output a second periphery image, which is an image of the photographed left side direction of the own vehicle, to the driving support ECU 30.

As illustrated in FIG. 2, the third periphery monitoring camera 23 is installed at a position P3 of a right side mirror of the own vehicle. The third periphery monitoring camera 23 is configured to photograph a right side direction of the own vehicle as the periphery of the own vehicle, and to output a third periphery image, which is an image of the photographed right side direction of the own vehicle, to the driving support ECU 30. The right side mirror is a mirror for the driver to monitor a right rear-lateral side direction of the own vehicle.

As illustrated in FIG. 2, the fourth periphery monitoring camera 24 is installed at a position P4 at a rear portion of the own vehicle. The fourth periphery monitoring camera 24 is configured to photograph a rear direction of the own vehicle as the periphery of the own vehicle, and to output a fourth periphery image, which is an image of the photographed rear direction of the own vehicle, to the driving support ECU 30.

Each of the periphery monitoring cameras 21 to 24 faces away from the vehicle. A road surface of the periphery of the own vehicle is shown in the images photographed by each of the periphery monitoring cameras 21 to 24. A wide-angle lens having an angle of view of 180 degrees or more is used for each of the periphery monitoring cameras 21 to 24, and the entire surroundings of the own vehicle can be captured by the four periphery monitoring cameras 21 to 24.

The driving support ECU 30 is configured to acquire the left rear-lateral side direction image photographed by the rear-lateral side monitoring camera 10 and the periphery images photographed by the four periphery monitoring cameras 21 to 24. The driving support ECU 30 includes a bird's-eye view image generation unit 31, an image processing unit 32, and a control unit 33.

The bird's-eye view image generation unit 31 is configured to acquire the first periphery image, the second periphery image, the third periphery image, and the fourth periphery image from the four periphery monitoring cameras 21 to 24, respectively. Those four periphery images cover a 360-degree area around the own vehicle. The bird's-eye view image generation unit 31 generates a bird's-eye view image around the own vehicle by modifying and arranging the four periphery images so as to have a bird's-eye view from directly above the own vehicle. The viewpoint of such a bird's-eye view image is a viewpoint looking directly down from the sky in the vertical direction.

When the bird's-eye view image generation unit 31 generates the bird's-eye view image, the viewpoint direction can be freely changed through use of the operation panel 70 such that the bird's-eye view image is looking diagonally down from the sky.

A system constructed from the four periphery monitoring cameras 21 to 24 and the function of the bird's-eye view image generation unit 31 is also referred to as a "surround view system," and is a known system.

The image processing unit 32 is configured to acquire the left rear-lateral side direction image from the rear-lateral side monitoring camera 10, and to acquire the bird's-eye view image from the bird's-eye view image generation unit 31. The image processing unit 32 crops an image of a cropping range including the blind spot range of the driver from the acquired bird's-eye view image, and generates a cropped image as a cropped bird's-eye view image.

Figure 3:
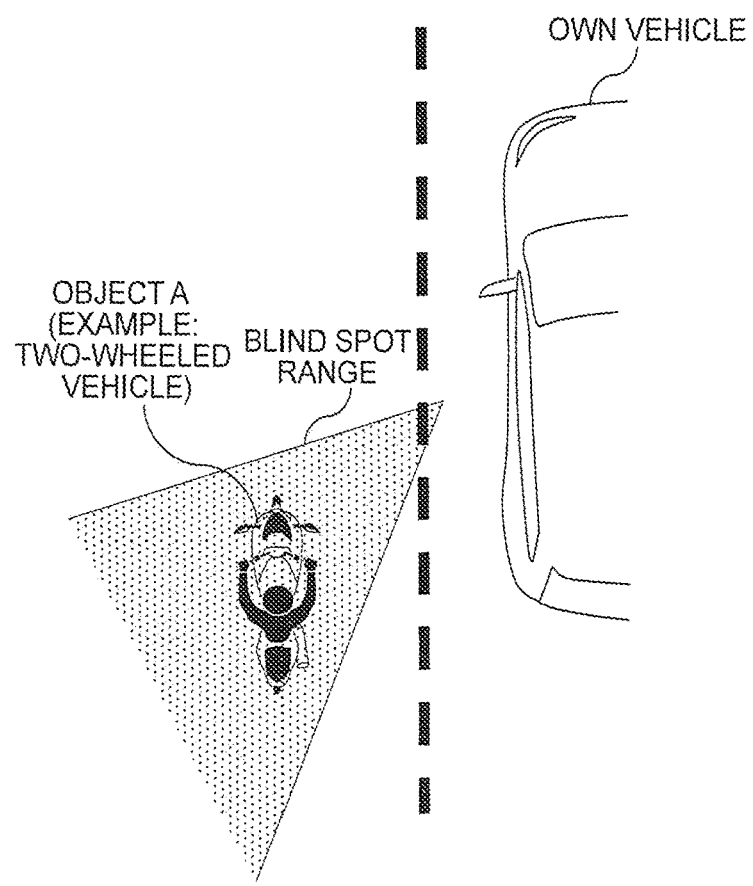
FIG. 3 is a diagram for illustrating a blind spot range in the first embodiment of the present invention.

The blind spot range of the driver is now described with reference to FIG. 3. FIG. 3 is a diagram for illustrating a blind spot range in the first embodiment of the present invention. In FIG. 3, there is illustrated a case in which a two-wheeled vehicle as an example of an object A is present in the blind spot range.

As illustrated in FIG. 3, there is a blind spot range in the rear-lateral side direction which is not visually recognizable by the driver even when the driver is monitoring the left side mirror of the own vehicle. When the object A is present in such a blind spot range, it is difficult for the driver to grasp the object A.

Figure 4:
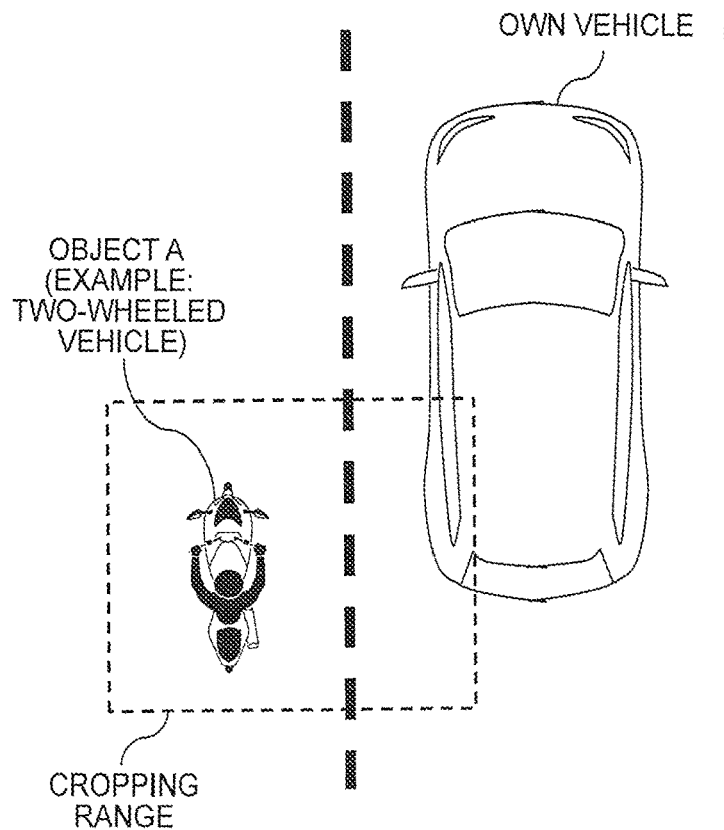
FIG. 4 is a diagram for illustrating processing of generating a cropped bird's-eye view image by an image processing unit in the first embodiment of the present invention.

Next, there is described processing of generating the cropped bird's-eye view image by the image processing unit 32 with reference to FIG. 4. FIG. 4 is a diagram for illustrating the processing of generating the cropped bird's-eye view image by the image processing unit 32 in the first embodiment of the present invention. In FIG. 4, there is illustrated a case in which a two-wheeled vehicle as an example of the object A is present in the cropping range.

As illustrated in FIG. 4, the image processing unit 32 crops an image of the cropping range from the bird's-eye view image acquired from the bird's-eye view image generation unit 31, and generates the cropped image as the cropped bird's-eye view image. The cropping range is a range including the above-mentioned blind spot range, and is a range determined in advance.

The image processing unit 32 converts the acquired left rear-lateral side direction image into an image in which left and right are inverted such that the driver can see an image which looks the same as when the driver looks at the left side mirror, and generates the converted image as a left rear-lateral side converted image. The left rear-lateral side converted image is a mirror image of the left rear-lateral side direction image.

The image processing unit 32 generates a combined image in which the generated cropped bird's-eye view image and the generated left rear-lateral side converted image are arranged adjacent to each other. The image processing unit 32 outputs the generated combined image to the control unit 33.

The cropping range from which the image processing unit 32 crops the bird's-eye view image can be freely changed by using the operation panel 70.

The control unit 33 is configured to acquire the combined image from the image processing unit 32, and to control the display device 40 such that the display device 40 displays the acquired combined image.

When the control unit 33 detects an object in the combined image acquired from the image processing unit 32, the control unit 33 issues a notification that the object is present in the combined image.

As an example of the notification, the control unit 33 draws on the combined image a mark indicating the presence of the object in the combined image. The mark is to warn the driver that the object is present in the periphery of the own vehicle.

As another example of the notification, the control unit 33 controls the warning device 50 such that the warning device 50 produces a warning sound indicating the presence of the object in the combined image. The warning sound is to warn the driver that the object is present in the periphery of the own vehicle.

When the control unit 33 does not detect an object in the combined image acquired from the image processing unit 32, the control unit 33 does not issue the above-mentioned notification.

Figure 5:
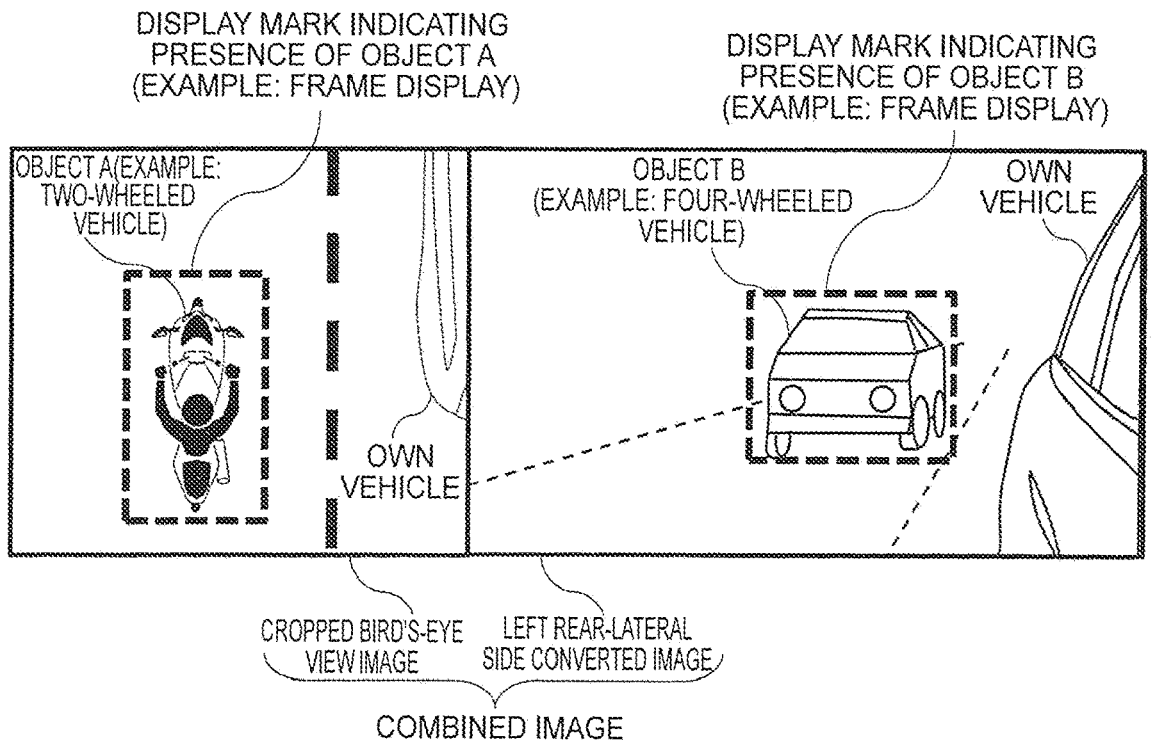
FIG. 5 is a diagram for illustrating a combined image displayed by a display device in the first embodiment of the present invention.

The display device 40 is installed in the cabin of the own vehicle, and is configured to display an image. Specifically, the display device 40 displays the combined image under the control of the control unit 33. There is now described an example of the combined image displayed by the display device 40 with reference to FIG. 5. FIG. 5 is a diagram for illustrating a combined image displayed by the display device 40 in the first embodiment of the present invention. In FIG. 5, there is illustrated a case in which a two-wheeled vehicle as the object A is shown in the cropped bird's-eye view image, and a four-wheeled vehicle as an example of an object B is shown in the left rear-lateral side converted image.

As illustrated in FIG. 5, the combined image displayed by the display device 40 is an image in which the cropped bird's-eye view image and the left rear-lateral side converted image are arranged adjacent to each other. In the cropped bird's-eye view image, as an example of a mark indicating the presence of the object A, a frame surrounding the object A is drawn by the control unit 33. In the left rear-lateral side converted image, as an example of a mark indicating the presence of the object B, a frame surrounding the object B is drawn by the control unit 33.

Through the display device 40 displaying such a combined image, it is possible to provide the driver with a field of view for driving support. The display device 40 is installed on the left side of the driver, for example, so that the driver can easily understand to pay attention to the left side.

The warning device 50 is configured to produce a sound by driving the speaker 60 installed in the cabin of the own vehicle. Specifically, the warning device 50 produces a warning sound by driving the speaker 60 under the control of the control unit 33. Through the warning device 50 producing such a warning sound, it is possible to urge the driver to check the combined image displayed on the display device 40.

The operation panel 70 is used by the driver to adjust the appearance of the combined image displayed by the display device 40. The driver can freely change the viewpoint direction of the bird's-eye view image generated by the bird's-eye view image generation unit 31 by operating the operation panel 70. In this way, the driving support device is configured to change the viewpoint direction of the bird's-eye view image generated by the driving support ECU 30.

Further, the driver can freely change the cropping range from which the image processing unit 32 crops the bird's-eye view image by operating the operation panel 70. As a result, the driver can freely set the cropping range in accordance with his or her blind spot range. In this way, the driving support device is configured to change the cropping range from which the driving support ECU 30 crops the bird's-eye view image.

Figure 6:
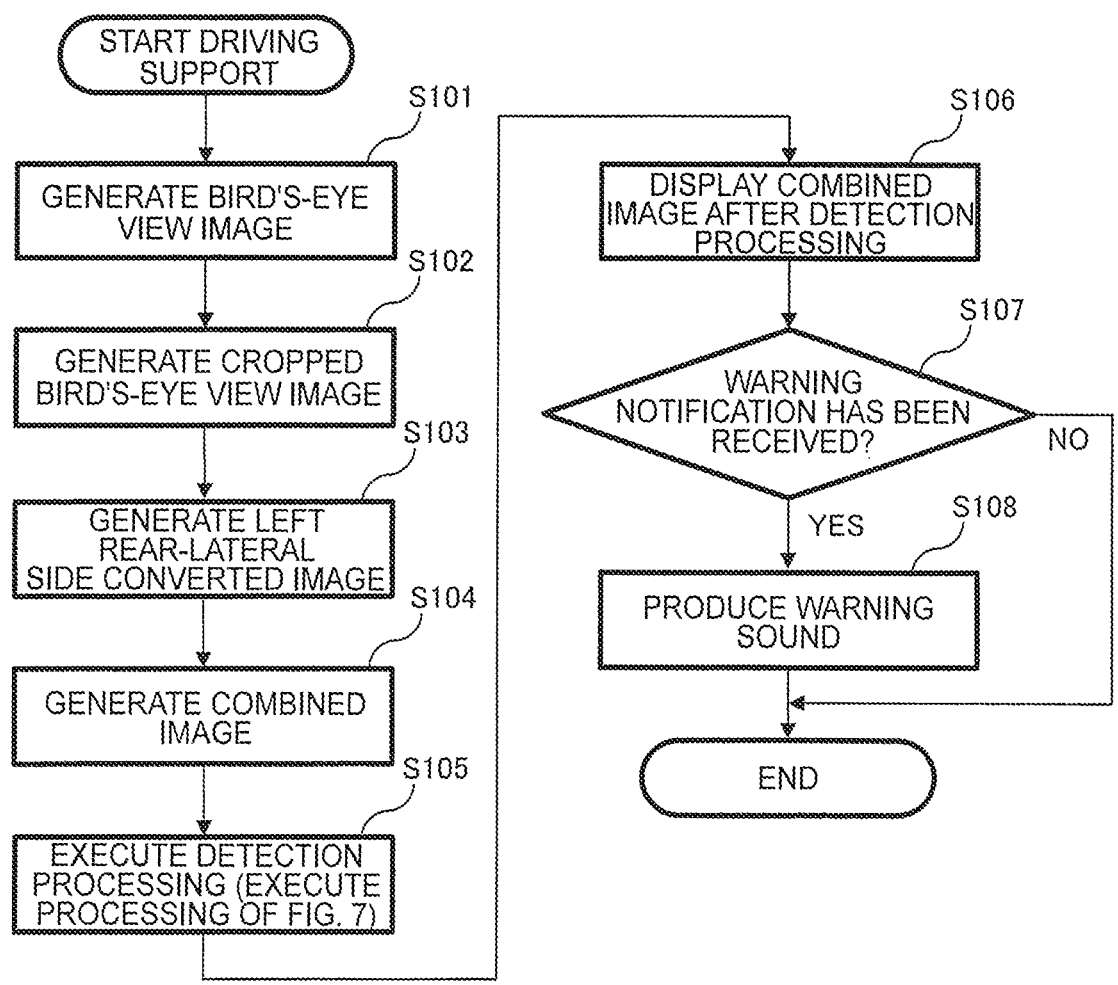
FIG. 6 is a flowchart for illustrating a series of driving support operations to be performed by the driving support device according to the first embodiment of the present invention.

Next, a series of driving support operations by the driving support device in the first embodiment is described with reference to FIG. 6. FIG. 6 is a flowchart for illustrating the series of driving support operations to be performed by the driving support device according to the first embodiment of the present invention. The driving support device repeats a series of processing steps illustrated in FIG. 6 at a certain operation cycle, for example.

In Step S101, the bird's-eye view image generation unit 31 uses the first periphery image, the second periphery image, the third periphery image, and the fourth periphery image acquired from the four periphery monitoring cameras 21 to 24, respectively, to generate a bird's-eye view image. After that, the processing advances to Step S102.

In this way, the driving support ECU 30 generates a bird's-eye view image around the own vehicle from the periphery images acquired from the four periphery monitoring cameras 21 to 24.

In Step S102, the image processing unit 32 generates a cropped bird's-eye view image by cropping an image of the cropping range from the bird's-eye view image generated in Step S101. After that, the processing advances to Step S103.

In this way, the driving support ECU 30 generates a cropped bird's-eye view image by cropping an image of the cropping range from the generated bird's-eye view image.

In Step S103, the image processing unit 32 generates a left rear-lateral side converted image by converting the left rear-lateral side direction image acquired from the rear-lateral side monitoring camera 10 into an image in which left and right are inverted. After that, the processing advances to Step S104.

In this way, the driving support ECU 30 generates a left rear-lateral side converted image by converting the left rear-lateral side direction image acquired from the rear-lateral side monitoring camera 10 into an image in which left and right are inverted.

In Step S104, the image processing unit 32 generates a combined image in which the cropped bird's-eye view image generated in Step S102 and the left rear-lateral side converted image generated in Step S103 are arranged adjacent to each other. After that, the processing advances to Step S105.

In this way, the driving support ECU 30 generates a combined image in which the generated cropped bird's-eye view image and the generated left rear-lateral side converted image are arranged.

In Step S105, the control unit 33 performs detection processing on the combined image generated in Step S104, and controls the display device 40 and the warning device 50 in accordance with a result of the detection processing. After that, the processing advances to Step S106. The details of the detection processing are described later with reference to the flowchart of FIG. 7.

In Step S106, the display device 40 displays the combined image on which the detection processing has been performed in Step S105. After that, the processing advances to Step S107.

In Step S107, the warning device 50 determines whether or not a warning notification has been received from the control unit 33 as a result of the detection processing of Step S105. When it is determined that a warning notification has been received, the processing advances to Step S108, and when it is determined that a warning notification has not been received, the processing ends.

In Step S108, in response to the warning notification received from the control unit 33, the warning device 50 produces a warning sound by driving the speaker 60. After that, the processing ends.

Figure 7:
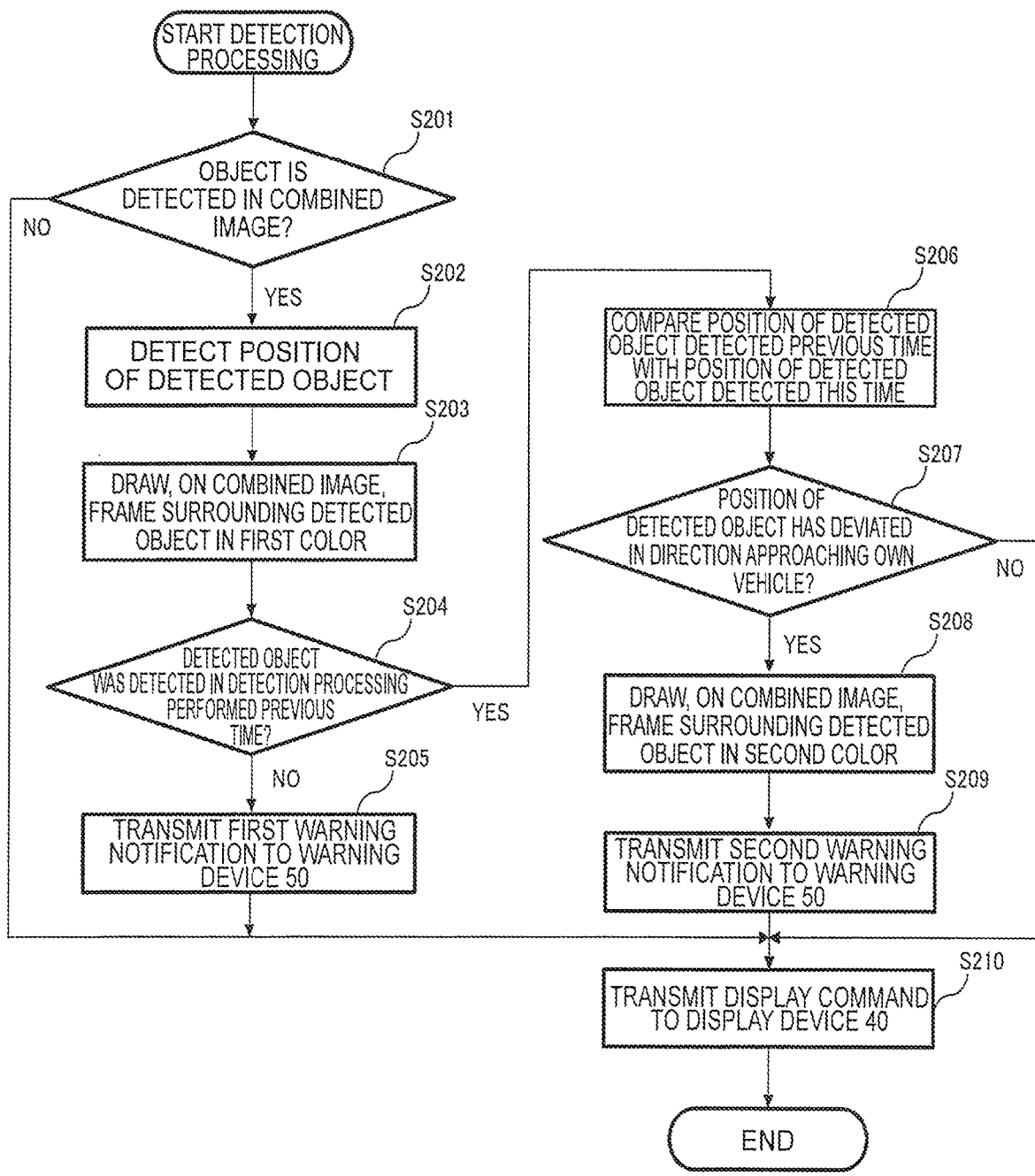
FIG. 7 is a flowchart for illustrating a series of detection processing steps to be performed by a control unit of a driving support ECU in the first embodiment of the present invention.

Next, a series of detection processing steps to be executed in Step S105 of FIG. 6 is described with reference to FIG. 7. FIG. 7 is a flowchart for illustrating the series of detection processing steps to be performed by the control unit 33 of the driving support ECU 30 in the first embodiment of the present invention.

In Step S201, the control unit 33 determines whether or not an object is detected in the combined image generated in Step S104 of FIG. 6. When it is determined that an object is detected in the combined image, the processing advances to Step S202. Meanwhile, when it is determined that an object is not detected in the combined image, the processing advances to Step S210.

In Step S202, the control unit 33 detects the position of the detected object, which is the object detected in Step S201. After that, the processing advances to Step S203.

The control unit 33 is configured to detect an object in the combined image together with the position of the object by applying a known object detection algorithm. Examples of such an object detection algorithm include an object detection algorithm based on deep learning, and more specifically, Single Shot MultiBox Detector (SSD).

In Step S203, the control unit 33 draws on the combined image a frame surrounding the detected object in a first color. The first color is, for example, yellow. After that, the processing advances to Step S204.

In this way, when the driving support ECU 30 detects an object in the combined image, a mark indicating the presence of an object in the combined image is drawn on the combined image.

In Step S204, the control unit 33 determines whether or not the detected object was detected in the detection processing performed the previous time. When it is determined that the detected object was detected in the detection processing performed the previous time, the processing advances to Step S206. Meanwhile, when it is determined that the detected object was not detected in the detection processing performed the previous time, the processing advances to Step S205.

In Step S205, the control unit 33 transmits a first warning notification to the warning device 50. After that, the processing advances to Step S210. When the warning device 50 receives the first warning notification from the control unit 33, the warning device 50 produces a first warning sound indicating that an object newly detected in the current detection processing is present.

In this way, when the driving support ECU 30 detects an object in the combined image, the driving support ECU 30 controls the warning device 50 such that the warning device 50 produces a warning sound indicating the presence of an object in the combined image.

In Step S206, the control unit 33 compares the position of the detected object detected in the detection processing performed the previous time with the position of the detected object detected in the detection processing performed this time. After that, the processing advances to Step S207. With such a position comparison being performed, it is possible to extract an object approaching the own vehicle.

In Step S207, the control unit 33 determines whether or not the position of the detected object has deviated in the direction approaching the own vehicle based on the position comparison performed in Step S206. When it is determined that the position of the detected object has deviated in the direction approaching the own vehicle, the processing advances to Step S208. Meanwhile, when it is determined that the position of the detected object has not deviated in the direction approaching the own vehicle, the processing advances to Step S210.

In Step S208, the control unit 33 draws on, the combined image in a second color, a frame surrounding the detected object determined as having deviated in the direction approaching the own vehicle, that is, the detected object approaching the own vehicle. The second color is different from the first color. The second color is, for example, red. After that, the processing advances to Step S209.

In this way, the driving support ECU 30 detects an object in the combined image, and when the object in the combined image is approaching the own vehicle, the driving support ECU 30 draws on the combined image a mark indicating the presence of an object approaching the own vehicle.

In Step S209, the control unit 33 transmits a second warning notification to the warning device 50. After that, the processing advances to Step S210. When the warning device 50 receives the second warning notification from the control unit 33, the warning device 50 produces a second warning sound indicating that an object approaching the own vehicle is present. The second warning sound may be the same as the first warning sound, or may be different from the first warning sound.

In this way, the driving support ECU 30 detects an object in the combined image, and when the object in the combined image is approaching the own vehicle, the driving support ECU 30 controls the warning device 50 such that the warning device 50 produces a warning sound indicating the presence of an object approaching the own vehicle.

In Step S210, the control unit 33 transmits a display command to the display device 40 such that the display device 40 displays the combined image. After that, the processing ends. When the display device 40 receives the display command from the control unit 33, the display device 40 displays the combined image after the series of detection processing steps.

In the first embodiment, there is described a case in which the rear-lateral side monitoring camera 10 is configured to photograph the left rear-lateral side direction of the own vehicle as a specific example of the rear-lateral side direction of the own vehicle, but the present invention is not limited to this. That is, the rear-lateral side monitoring camera 10 may be configured to photograph the right rear-lateral side direction of the own vehicle.

In the above-mentioned case, the cropping range is a range including the blind spot range of the right rear-lateral side direction which is not visually recognizable by the driver even when the driver is monitoring the right side mirror of the own vehicle. The bird's-eye view image generation unit 31 is configured to generate a cropped bird's-eye view image by cropping an image of this cropping range from the generated bird's-eye view image. Further, the image processing unit 32 is configured to generate a right rear-lateral side converted image by converting a right rear-lateral side direction image acquired from the rear-lateral side monitoring camera 10 into an image in which left and right are inverted such that the driver can see an image which looks the same as when the driver looks at the right side mirror.

As described above, in the first embodiment, the driving support ECU 30 of the driving support device is configured to generate a bird's-eye view image around the own vehicle from the periphery images acquired from the plurality of periphery monitoring cameras 21 to 24, and to generate a cropped bird's-eye view image by cropping an image of the cropping range including the blind spot range of the driver from the generated bird's-eye view image. Further, the driving support ECU 30 is configured to generate a rear-lateral side converted image by converting the rear-lateral side direction image acquired from the rear-lateral side monitoring camera 10 into an image in which left and right are inverted. Moreover, the driving support ECU is configured to generate a combined image in which the generated cropped bird's-eye view image and the generated rear-lateral side converted image are arranged, and to control the display device 40 such that the generated combined image is displayed by the display device 40.

In this way, through display of the rear-lateral side converted image forming the combined image, the field of view of the related-art side mirror can be secured, and as a result, the sense of distance to an object in the periphery of the own vehicle can be grasped. Further, through also display of the cropped bird's-eye view image forming the combined image, the situation of the blind spot range, which is a blind spot in the case of the related-art side mirror, can be grasped.

Each function of the driving support ECU 30 of the driving support device according to the first embodiment is implemented by a processing circuit. The processing circuit for implementing each function may be dedicated hardware, or may be a processor configured to execute a program stored in a memory.

When the processing circuit is dedicated hardware, the processing circuit corresponds to, for example, a single circuit, a composite circuit, a programmed processor, a parallel-programmed processor, an application specific integrated circuit (ASIC), a field programmable gate array (FPGA), or a combination thereof. The functions of the bird's-eye view image generation unit 31, the image processing unit 32, and the control unit 33 may each be implemented by an individual processing circuit, or may be implemented together by one processing circuit.

Meanwhile, when the processing circuit is a processor, the function of each of the bird's-eye view image generation unit 31, the image processing unit 32, and the control unit 33 is implemented by software, firmware, or a combination of software and firmware. The software and the firmware are coded as programs and stored in a memory. The processor reads out and executes the programs stored in the memory, to thereby implement the function of each of the units.

It is also understood that those programs cause a computer to execute the functions of the respective units described above. In this case, the memory corresponds to, for example, a random access memory (RAM), a read only memory (ROM), a flash memory, an erasable programmable read only memory (EPROM), an electrically erasable and programmable read only memory (EEPROM), or other such non-volatile or volatile semiconductor memory. The memory also corresponds to, for example, a magnetic disk, a flexible disk, an optical disc, a compact disc, a MiniDisk, or a DVD.

Some of the functions of the respective units described above may be implemented by dedicated hardware, and other thereof may be implemented by software or firmware.

In this way, the processing circuit can implement the function of each of the units described above by hardware, software, firmware, or a combination thereof.

REFERENCE SIGNS LIST 10 rear-lateral side monitoring camera, 21 first periphery monitoring camera, 22 second periphery monitoring camera, 23 third periphery monitoring camera, 24 fourth periphery monitoring camera, 30 driving support ECU, 31 bird's-eye view image generation unit, 32 image processing unit, 33 control unit, 40 display device, 50 warning device, 60 speaker, 70 operation panel

The invention claimed is:

1. A driving support device, configured to assist a driver of a host vehicle comprising:
 a rear-lateral side monitoring camera having a same orientation as an orientation of a side mirror of the host vehicle, and configured to photograph an image of a rear-lateral side direction of the host vehicle with an angle of view which enables a sense of distance to a first object in the rear-lateral side direction of the host vehicle;
 a plurality of periphery monitoring cameras each configured to photograph a periphery of the host vehicle;
 a processor configured to acquire the image of the rear-lateral side direction, and periphery images which are images of the periphery of the host vehicle photographed by the plurality of periphery monitoring cameras; and
 a display device configured to display an image, wherein the processor is configured to:
- generate a bird's-eye view image which is an image looking down from the sky around the host vehicle from the periphery images acquired from the plurality of periphery monitoring cameras, and generate a cropped bird's-eye view image by cropping an image of a cropping range including a blind spot range and only a part of the host vehicle from the generated bird's-eye view image;
- generate a rear-lateral side converted image by converting the image of the rear-lateral side direction into an image in which left and right are inverted; and
- generate a combined image in which the generated cropped bird's-eye view image and the generated rear-lateral side converted image are arranged, and control the display device such that the generated combined image is displayed by the display device, wherein in the combined image, the cropped bird's-eye view image shows a second object in the blind spot range, and the rear-lateral side converted image shows the first object that is visible through the side mirror at which the rear-lateral side monitoring camera is installed, and wherein the second object in the cropped bird's-eye view image is not captured in the rear-lateral side converted image, and the first object in the rear-lateral side converted image is not captured in the cropped bird's-eye view image,
- in response to detecting the first object or the second object approaching the host vehicle, change a visual appearance of a notification indicating presence of the first object or the second object in the combined image.

2. The driving support device according to claim 1, wherein the processor is configured to issue, when the first object or the second object is detected in the generated combined image, the notification indicating presence of the first object or the second object in the combined image.

3. The driving support device according to claim 2, wherein the processor is configured to draw on the combined image a mark indicating the presence of the first object or the second object as the notification.

4. The driving support device according to claim 1, wherein the processor is further configured to draw, when the first object or the second object in the combined image is approaching the host vehicle, on the combined image, a mark indicating the presence of the first object or the second object approaching the host vehicle as the notification, and change the color of the mark to indicate that the first object or the second object is approaching the host vehicle.

5. The driving support device according to claim 2, further comprising a warning device configured to produce a sound, wherein the processor is configured to control the warning device such that the warning device produces a warning sound indicating the presence of the first object or the second object as the notification.

6. The driving support device according to claim 2, further comprising a warning device configured to produce a sound, wherein the processor is further configured to control, when the first object or the second object in the combined image is approaching the host vehicle, the warning device such that the warning device produces a warning sound indicating the presence of the first object or the second object approaching the host vehicle as the notification.

7. The driving support device according to claim 1, wherein the driving support device is configured to change the cropping range from which the processor crops the bird's-eye view image.

8. The driving support device according to claim 1, wherein the driving support device is configured to change a viewpoint direction of the bird's-eye view image generated by the processor.

* * * * *